United States Patent
Baker et al.

(10) Patent No.: US 8,939,033 B2
(45) Date of Patent: Jan. 27, 2015

(54) FLOW METER SYSTEM AND METHOD FOR MEASURING AN AMOUNT OF LIQUID IN A LARGELY GASEOUS MULTIPHASE FLOW

(75) Inventors: Andrew Charles Baker, Kleppesto (NO); Cosan Ayan, Istanbul (TR)

(73) Assignee: Schlumberger Technology Corporation, Sugar Land, TX (US)

( * ) Notice: Subject to any disclaimer, the term of this patent is extended or adjusted under 35 U.S.C. 154(b) by 180 days.

(21) Appl. No.: 13/814,134

(22) PCT Filed: Jul. 20, 2011

(86) PCT No.: PCT/EP2011/003712
§ 371 (c)(1),
(2), (4) Date: Feb. 27, 2013

(87) PCT Pub. No.: WO2012/016652
PCT Pub. Date: Feb. 9, 2012

(65) Prior Publication Data
US 2013/0174668 A1  Jul. 11, 2013

Related U.S. Application Data

(60) Provisional application No. 61/370,562, filed on Aug. 4, 2010.

(51) Int. Cl.
*G01F 1/74* (2006.01)
*G01F 1/44* (2006.01)
(Continued)

(52) U.S. Cl.
CPC .. *G01F 1/74* (2013.01); *G01F 1/44* (2013.01); *G01F 1/704* (2013.01); *G01F 25/0007* (2013.01)
USPC .................................. 73/861.04; 73/861.63

(58) Field of Classification Search
None
See application file for complete search history.

(56) References Cited

U.S. PATENT DOCUMENTS 5,400,657 A * 3/1995 Kolpak et al. .............. 73/861.04
5,922,969 A   7/1999 Haar
(Continued)

FOREIGN PATENT DOCUMENTS

JP  59120814  7/1984
SU  1420375  8/1988
(Continued)

OTHER PUBLICATIONS

Office action for the equivalent Russian patent application No. 2013109257 issued on Apr. 18, 2014.
(Continued)

*Primary Examiner* — Harshad R Patel
(74) *Attorney, Agent, or Firm* — Cameron R. Sneddon

(57) ABSTRACT

Both a flow meter system and method are provided for accurately measuring the percentage amounts of liquid and gas phases in a multiphase flow through a conduit when the liquid phase constitutes a small minority portion (e.g., less than about 20%) of the multiphase flow. The system includes a flow meter that includes a differential pressure sensor connected across a Venturi in the conduit, and a dual energy fraction meter, each of which is operably connected to a digital processor. The system further includes a pump connected to the conduit upstream of the flow meter that introduces at least one pulse of a known quantity of liquid, the pulse being sufficient in volume to temporarily increase the liquid phase by a detectable amount. After the liquid pulse is introduced into the multi-phase flow, the digital processor computes the changes in the percentage amounts of the liquid and gas phases which should have occurred as a result of the pulse, and compares the computed changes with the actual changes measured by the flow meter in order to calibrate the flow meter. The measured increase in the liquid flow is then subtracted from the total measured liquid flow to determine the actual percentage of liquid flow.

20 Claims, 6 Drawing Sheets

(51) Int. Cl.
*G01F 1/704* (2006.01)
*G01F 25/00* (2006.01)

(56) References Cited

U.S. PATENT DOCUMENTS

| | | |
|---|---|---|
| 7,240,568 B2 | 7/2007 | Atkinson |
| 2006/0236779 A1 | 10/2006 | Atkinson |
| 2008/0000306 A1 | 1/2008 | Agar et al. |
| 2010/0011876 A1 | 1/2010 | Vyas et al. |

FOREIGN PATENT DOCUMENTS

| | | |
|---|---|---|
| WO | 99/13859 | 11/1990 |
| WO | 00/67018 | 11/2000 |
| WO | 2006/121480 | 11/2006 |

OTHER PUBLICATIONS

Decision on grant for the equivalent Russian patent application No. 2013109257 issued on Jul. 14, 2014.

* cited by examiner

FLOW METER SYSTEM AND METHOD FOR MEASURING AN AMOUNT OF LIQUID IN A LARGELY GASEOUS MULTIPHASE FLOW

CROSS-REFERENCE TO RELATED APPLICATION

The present application is based on and claims priority to U.S. Provisional Patent Application No. 61/370,562, filed Aug. 4, 2010.

TECHNICAL FIELD

This invention is generally concerned with flow meters for monitoring multiphase fluid flows, and is specifically concerned with a flow meter system and method capable of self-calibrating and accurately measuring the percentage amount of a liquid phase in a multiphase flow consisting largely of a gaseous phase.

BACKGROUND

Multiphase flow meters are used to measure the percentages of gas and liquid flowing out of petroleum wells. Current multiphase flow meters lose accuracy in the measurement of the liquid fraction when the gas fraction becomes predominant. This is illustrated by the trumpet-shaped curve shown in FIG. 1 that represents the typical relative error rate of the measured values of liquid fraction flow as a function of the gas volume fraction (GVF). The curve shows that for a gas volume fraction (GVF) greater than 85%, the relative error rate becomes greater than about 5% and becomes unpredictable for a gas volume fraction (GVF) greater than 99%.

One known technique to solve this problem is to separate a large quantity of gas from the multiphase flow upstream of the flow meter and therefore lower the ratio of gas in the multiphase flow to lower than 85%. Then it becomes possible to measure the percentage amounts of each of the phases with higher accuracy. The actual amount of liquid in the multiphase flow can be computed by determining the amount of gas that was separated from the flow prior to the phase measurements. Unfortunately, this technique requires the use of bulky equipment mounted upstream of the multiphase meter to separate the gas from liquid phase. Such a technique negates the principal advantage associated with such multiphase flow meters, which is the ability to measure the percentage amounts of gas and liquid in a multiphase fluid without the need for separating the gas from the liquid.

A variation of this known technique is to make a partial separation of the gas from a main line of oil, water and gas using a gas diversion line. Such a technique is disclosed in PCT/GB00/01660. Some of the gas is diverted from the main line upstream of the multiphase meter but it is important to mention that there is still some gas flowing through the main line of the multiphase meter.

This partial separation requires the gas to be substantially perfectly dry to avoid losing some of the liquid through the gas diversion line. Consequently, the issue of gas quality (entrainment of liquid inside the gas) becomes as problematic as with a normal separator and the same problems of carry over or carry under are present. Carry over is having some heavier phase going into the gas line (i.e. heavy oil bubbles going into the gas line). Carry under is the opposite, having some gas bubbles going into the oil or water line. Both of these are due to a poor separation of the gas and liquid phases with one predominant phase flowing fast or due to a lack of density contrast between the flowing phases. To cope with this issue, some manufacturers include additional sensors to control or measure the dryness of the extracted gas. Unfortunately, the inclusion of an additional sensor to measure or control dryness increases the complexity of the multiphase flow meter and increases costs.

Another known technique to solve the error rate problem in multiphase flow measurements is to provide upstream of the multiphase flow meter a retention section for loading the multiphase flow meter with some liquid and releasing it in a controlled manner along with the gas in a certain proportion to be able to reduce the relative gas content. Such a solution is illustrated in PCT/GB90/00701 and PCT/US2006/005825 assigned to Framo Engineering and US Published Patent Application No. 2008/0000306 assigned to AGAR Corporation. As indicated previously, such solutions require costly and bulky equipment.

In addition to increased costs, such solutions lack flexibility since the upstream equipment must be specifically designed for an expected flow rate, which of course cannot be guaranteed for the entire life of a well, which may be over 20-50 years.

The multiphase flow meter market is segmented into three main types of multiphase flow meters, including a wet gas multiphase flow meters known as Type I flow meters for measuring only the gas phase flow of the multiphase flow, multiphase flow meters known as type II flow meters capable of measuring liquid and gas, and multiphase flow meters known as type III flow meters capable of measuring and distinguishing all three phases that are usually flowing out of petroleum wells, i.e., oil or condensate, water, and gas.

Unfortunately, all three types of flow meters suffer the same accuracy problem when a high Gas Volume Fraction (GVF) is present.

SUMMARY OF THE DISCLOSURE

In contrast to the prior art, the system of the invention is capable of accurately measuring the percentage amounts of liquid and gas phases in a multiphase fluid flowing through a conduit when one of the phases, such as the liquid phase, constitutes a small portion (i.e. 15% or less) of the multiphase fluid without the need for complicated and expensive upstream mechanisms. To this end, the system comprises a flow meter positioned on the conduit that measures the percentage amounts of liquid and gas phases in said multiphase fluid flowing through the conduit; a pump connected to said conduit upstream of said flow meter that introduces at least one pulse of a known quantity of a fluid having the same or substantially the same composition as the smaller phase, the pulse being sufficient to temporarily increase the smaller phase by a detectable amount. The system further includes a digital processor that (1) computes the changes in the percentage amounts of the liquid and gas phases which should have occurred as a result of the introduction of the at least one pulse of the fluid, and compares the computed changes with the changes measured by the flow meter in order to calibrate the flow meter then (2) subtracts the measured increase in the fluid flow from the total measured flow to determine the actual percentage amounts of liquid and gas phases in the multiphase fluid flowing through the conduit.

In the context of this application, the terms "small portion", "minority portion", "minority phase", "smaller phase" and "smaller portion" are to be construed as a portion of the multifluid flow amounting to between about 20% and about 0.1% of the total flow. The terms "multiphase" and "multifluid" are synonyms and refer to a fluid containing more than one phase, e.g., a gas and a liquid phase.

The flow meter may include a dual energy fraction meter, and a differential pressure sensor connected to the digital processor. The dual energy fraction meter may measure differences in the absorption of the multiphase flow of two different wavelengths of gamma radiation. The conduit includes a constricted portion and the differential pressure sensor measures a pressure differential between the constricted portion and an unconstricted portion of the conduit.

The pump may be connected to a source of fluid having the same or substantially the same composition as the smaller phase. If one of the liquid phases is water, and the pump is submerged in the ocean, the pump may simply be connected to ambient seawater. Any one of a number of pumps may be used to implement the invention, such as a piston type metering pump.

The invention further includes a method of accurately measuring the percentage amounts of liquid and gas phases in a multiphase fluid flowing through a flow meter when one of the phases constitutes a minority of the multiphase fluid, comprising: introducing at least one pulse of a known amount of a fluid having the same or substantially the same composition as the minority phase upstream of the flow meter, the pulse being sufficient in volume to temporarily increase the minority phase by a detectable amount, and measuring via the flow meter the changes in the flow rates of the phases caused by the pulse. Next, the changes in the percentage amounts of the liquid and gas phases which should have occurred as a result of the introduction of the one pulse the fluid are computed, and compared with the changes measured by the flow meter in order to calibrate the flow meter. Finally, the measured increase in the fluid flow of the minority phase is subtracted from the total measured flow of the minority phase to determine the actual percentage amount of the minority phase flowing through the conduit.

Advantageously, the metering pump needs to discharge only small volumes of the minority phase into the multiphase flow in order to obtain an accurate measurement of the minority phase. For example, if the multiphase flow is comprised of 0.1% liquid and 99.9% gas, the liquid pulse need only be of a volume to increase the liquid flow by 0.1% (assuming the flow metering can detect such a small pulse). While the pulse may only increase the liquid flow by 0.1%, the total liquid flow will have been increased by 100% (to 0.2%), thus providing a relatively large increase in the liquid flow that can be effectively used to calibrate the flow meter. The fact that only small volumes of the minority phase are required for accurate measurements allows the use of a relatively small capacity metering pump and minority fluid reservoir. Additionally, the applicants have observed that the fluid injected by the pump does not have to be exactly the same composition of the minority phase in the multiphase flow in order to obtain accurate measurements. Consequently, if the flow meter system is located underwater, and the minority phase is liquid, the pump can draw from the ambient water (whether it comes from the sea, a lake or a river), thereby obviating the need for a water reservoir. The use of a metering pump to supply pulses of the minority phase in a square wave pattern is also advantageous as the volumetric accuracy and timing that can be achieved with such pumps provides a relatively clean pattern of minority phase flow sharp increases that can be readily detected by the flow meter.

In contrast to the prior art, the inventive system requires no separation of the liquid and gas phases of the multiphase fluid upstream of the flow meter system. The flow meter system of the invention is completely flexible and can be used to obtain accurate percentage measurements of liquid and gas even in situations where the ratio of liquid to gas undergoes substantial fluctuations.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION OF THE DISCLOSURE

Various embodiments and aspects of the invention will now be described in detail with reference to the accompanying figures. The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited. Throughout this application, the subscript "LC," associated with some parameters, means at line conditions.

Figure 1:
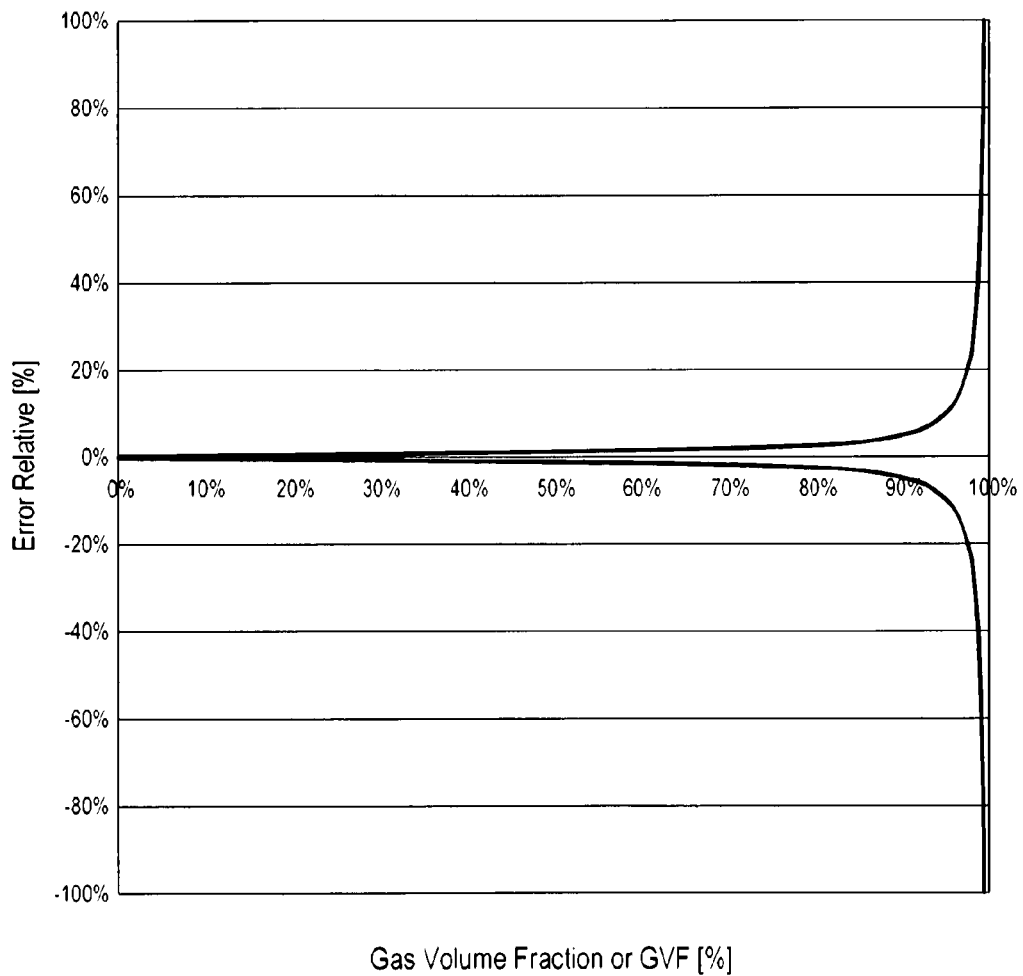
FIG. 1 represents a typical relative error rate for flow rate measurements in multiphase conditions.

The trumpet shape of the relative error of the liquid (or oil or water) phase shown in FIG. 1 comes from the mathematical solution or propagation error. The error is substantially independent of the technology used (i.e., technique of measurement). A multiphase flow meter gives a primary output, which is the total volumetric flow rate or mass flow rate. This is less cumbersome to do than to try to measure each phase distinctively and at the same time. Then a fraction measurement technique provides a first distinction of one phase among the others. Most multiphase flow meters look for the distinction of gas liquid ratio (i.e., GOR1 for gas to oil ratio or GWR1 for gas to water ratio or GLR for gas to liquid ratio) due to the large contrast in terms of properties between these two phases. This leads by definition to the measurement or the calculation of the Gas Volume Fraction (GVF). Again, it is important to mention that this is irrespective of the technique of measurement. For example, there are some meters claiming to measure either the total volumetric flow rate and then a gas flow rate, or directly measuring the GVF or again some doing a model of the GVF versus other parameters. In any case, this leads to the same result, which is an evaluation of the GVF parameter defined as follows:

$$GVF = \frac{Qgas_{LC}}{Qtot_{LC}} \qquad \text{Equation (1)}$$

In Equation (1), $Qgas_{LC}$ is the flow rate of gas (quantity expressed in mass or volume of gas per unit of time), and $Qtot_{LC}$ is the flow rate of the whole flow (quantity expressed in mass or volume of the whole multiphase flow per unit of time). Further, a distinction between the oil and water phases is made that leads to a straight measurement of the flow rate. The water liquid ratio (WLR) can be calculated. The opposite parameter, oil liquid ratio (OLR), can be also calculated. The sum of both parameters is equal to 1.

$$WLR = \frac{Qwater_{LC}}{Qliq_{LC}} \quad \text{Equation (2)}$$

In Equation (2), $Qwater_{LC}$ is the flow rate of water (quantity of water in the multiphase flow expressed in mass or volume of water per unit of time), $Qliq_{LC}$ is the flow rate of the whole liquid phase of the flow (quantity of the liquid phase in the multiphase flow expressed in mass or volume of liquid by unit of time), each at line conditions and $$OLR = \frac{Qoil_{LC}}{Qliq_{LC}} \quad \text{Equation (3)}$$

In Equation (3), OLR is the oil to liquid ratio, $Qoil_{LC}$ is the flow rate of oil of the flow (quantity of oil in the multiphase flow expressed in mass or volume of oil by unit of time), and $$OLR+WLR=1 \quad \text{Equation (4)}$$

It is therefore possible to calculate the error of the water flow rate, for example. (This could be done for the other variables such as oil in the same way):

$$Qwater_{LC}=WLR \cdot Qliq_{LC}=WLR \cdot (Qtot_{LC}-Qgas_{LC}) \quad \text{Equation (5)}$$

Equation (5) is equivalent to:

$$Qwater_{LC}=WLR \cdot Qtot_{LC} \cdot (1-GVF) \quad \text{Equation (6)}$$

The relative error is then calculated using here the method of the root mean square but any other known method would lead to errors of similar magnitude:

$$\frac{\Delta Qwater_{LC}}{Qwater_{LC}} = \sqrt{\left(\frac{\Delta WLR}{WLR}\right)^2 + \left(\frac{\Delta Qtot_{LC}}{Qtot_{LC}}\right)^2 + \left(\frac{\Delta GVF}{1-GVF}\right)^2} \quad \text{Equation (7)}$$

For oil, the relative error rate is, using again for instance the method of the root mean square:

$$\frac{\Delta Qoil_{LC}}{Qoil_{LC}} = \sqrt{\left(\frac{\Delta WLR}{1-WLR}\right)^2 + \left(\frac{\Delta Qtot_{LC}}{Qtot_{LC}}\right)^2 + \left(\frac{\Delta GVF}{1-GVF}\right)^2} \quad \text{Equation (8)}$$

In Equations (7) and (8), $\Delta WLR$ is the absolute error with respect to WLR, $\Delta Qtot_{LC}$ is the absolute error with respect to $Qtot_{LC}$, and $\Delta GVF$ is the absolute error with respect to GVF.

We have calculated the relative error on $Qwater_{LC}$ or $Qoil_{LC}$, as expressed by equations 7 and 8 respectively, and shown that it depends on 3 parameters which are water liquid ratio (WLR), total volumetric flow rate or total mass flow rate Qtot (both relative errors, mass or volume, being equal), and Gas Volume Fraction (GVF). Usually the accuracy of WLR and GVF is given in terms of an absolute error. The errors on the total volumetric or total mass flow rates are given most of the time in terms of relative error.

It is quite common to get, in a certain range, a relative error, which is constant for the volumetric or mass flow rate Qtot except at a low volumetric or mass flow rate. It is then possible to reduce equation (8), for graphic representation, to only two parameters as presented on FIGS. 2 and 3.

Figure 2:
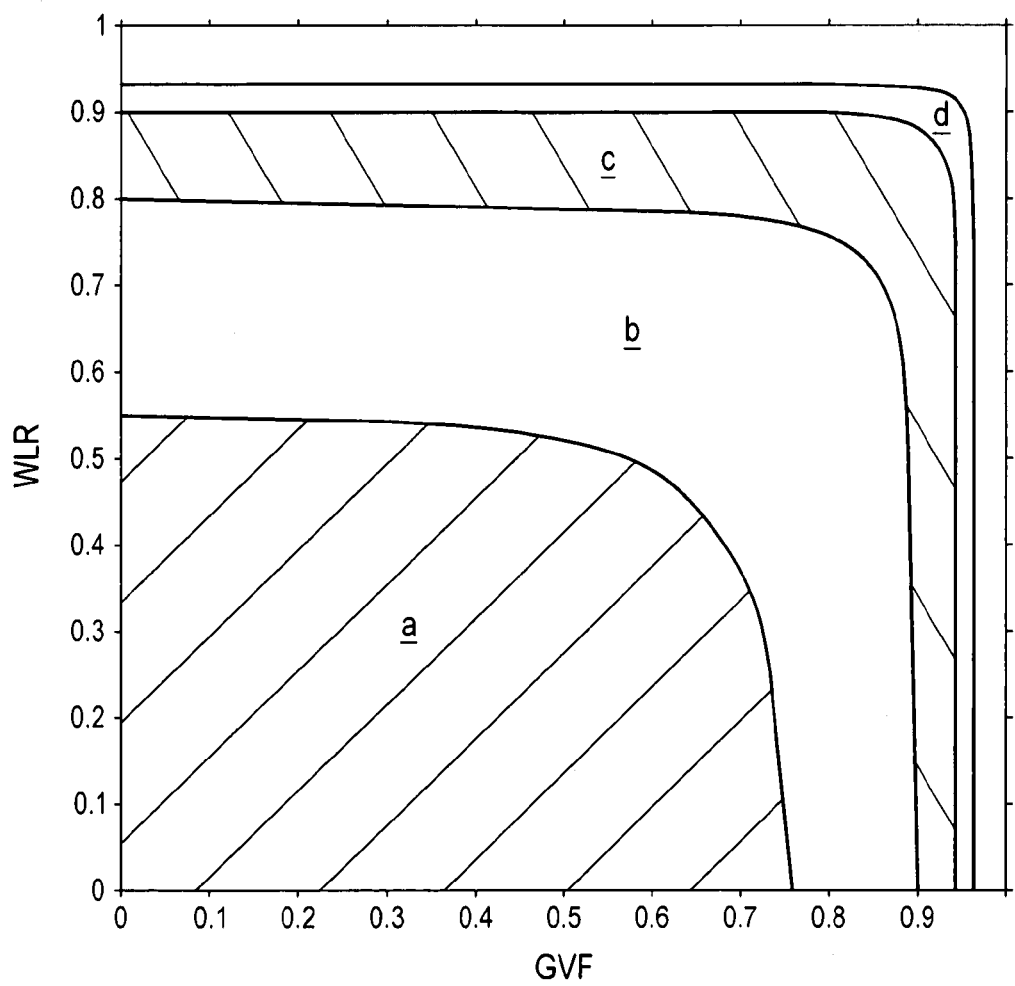
FIGS. 2 and 3 represent, each in a two dimensional plan, the dimensions being the gas volume fraction (GVF) and the water to liquid ratio (WLR), zones where the relative error of the oil flow rate is between two values, for flow meters according to the prior art.
Figure 3:
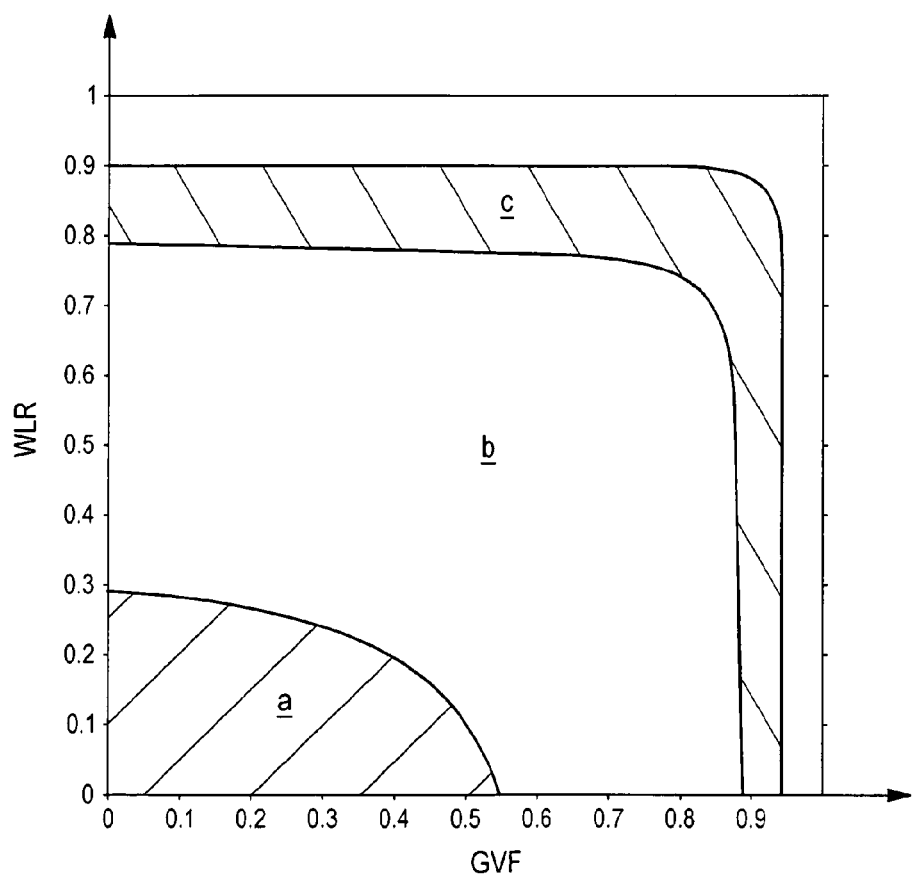

FIGS. 2 and 3 represent values of the errors in a two dimensional plan. The two dimensions are GVF, the values of which are on the abscissa and WLR which is on the ordinate. An absolute error is assumed to be 0.02 for WLR and 0.01 for GVF. The relative errors on total volumetric flow rate Qtot have been assumed at 2% and 4% on the graphics of FIGS. 2 and 3 respectively.

Figure 4:
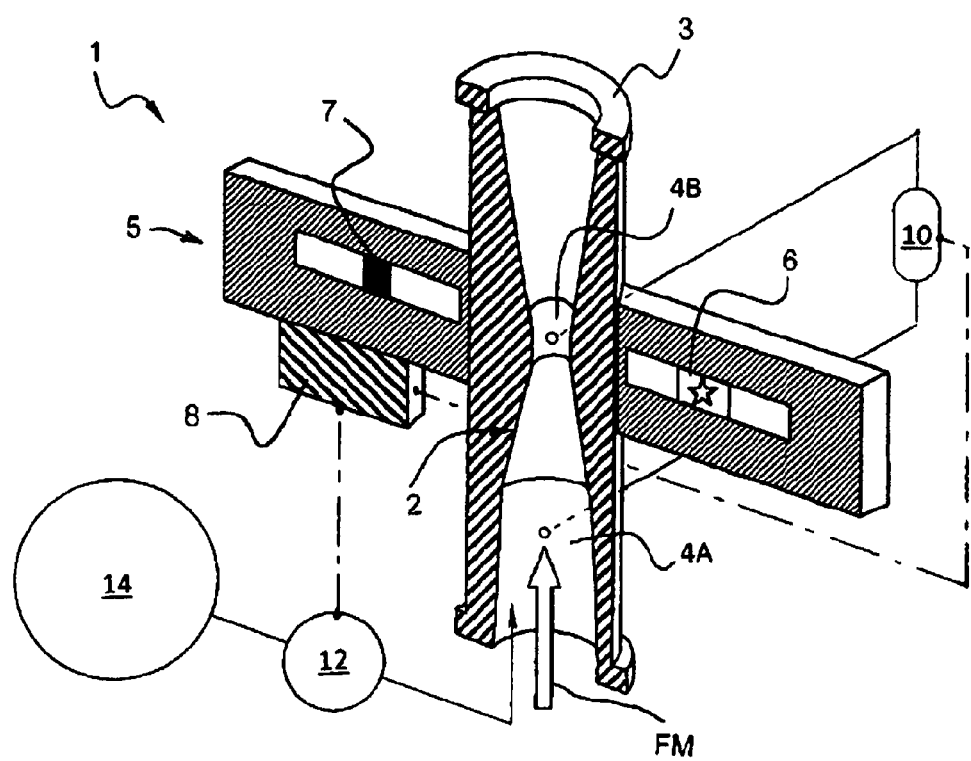
FIG. 4 is a schematic representation of one embodiment of the flow meter system of the invention.

FIG. 4 is a schematic representation of the flow meter system 1 of the invention. The system 1 comprises a conduit in the form of a pipe section 3 in which the internal diameter gradually decreases from an upstream part 4A to a throat 4B, forming a convergent Venturi 2. The convergent Venturi 2 induces a pressure drop between the upstream part 4A and the throat 4B. The pipe section 3 can be coupled to any flowing line LN by any appropriate coupling arrangement (not shown).

The system 1 further comprises a dual energy fraction flow meter 5. Flow meter 5 includes a source 6 and a detector 7 for measuring the density and fractions of the multiphase fluid mixture (FM). The source 6 and the detector 7 are diametrically positioned on each opposite sides of the throat 4B in appropriate blocks coupled to the pipe section 3. Flow meter 5 further includes a digital processor 8 electrically connected to the detector 7 for processing signals generated by the detector in a manner described in more detail hereinafter. The flow meter 5 also includes a differential pressure sensor 10 fluidly connected to the conduit 3 between the upstream part 4A and the throat 4B, and electrically connected to the digital processor 8 as indicated. While not shown in FIG. 4, the flow meter 5 may also have temperature sensors.

Finally, the system 1 includes a pump 12 fluidly connected to a liquid reservoir 14 capable of injecting metered slugs or pulses of a fluid, e.g., a liquid or gas, from the reservoir 14 into the fluid mixture FM at a point upstream from the connection points of the differential pressure sensor 10. The upstream liquid injection point could be a single point, or several connected together via an external manifold, or an injection ring that injects evenly around the entire pipe circumference. Alternatively, the Venturi 2 could be modified to include an extra channel through which calibration fluids, e.g., liquids or gases, could be injected and flushed out again. The pump 12 may be a positive displacement pump that employs, for example, reciprocating pistons, the principal requirements being that (1) the pump must be able to discharge accurately calibrated slugs or pulses of liquid against the pressure in the multiphase flow line; (2) the pulses or slugs must be sufficiently large to modify the minority fluid fraction (be it liquid or gas) to a high enough level (e.g. >15%) to substantially reduce the measurement error rate, and (3) the pump must be able to vary the quantity of fluid, e.g., liquid, in the slugs or pulses in order to accommodate changing liquid/gas fractions over the life of the well. The pump 12 is electrically connected to and controlled by the digital processor 8.

In this example of the system 1, the reservoir 14 contains a liquid having the same or substantially the same composition as the liquid phase of the fluid mixture FM, such as oil or water. However, in situations where the system is submerged in a body of water and water is a principal constituent of the fluid mixture FM, the reservoir may be eliminated and the pump may simply withdraw liquid from the surrounding water. Alternatively, two or more liquid tanks can be connected to the pump 1, which would allow two or more liquids to be injected into the pipe 3 at different times, e.g. freshwater and diesel. Such an alternative arrangement would assist in calibration of the water liquid ratio of a multiphase or wet gas meter. The choice of liquid is dependent on the specific application but since the liquid is not recovered, it must be chosen so that it is acceptable as an additional component in the flow stream.

In operation, the digital controller 8 actuates the pump 12 to inject either a single pulse of a known quantity or a series of pulses of known quantities of the liquid from the reservoir 14. The pulse or pulses of liquid enter the pipe 3 upstream of the dual energy fraction flow meter 5 and increase the fraction of minority phase, which in this example is the liquid phase. Each pulse should be sufficient in volume to temporarily increase the minority phase by a detectable amount. Fortunately, the volume amount of each pulse may be quite small, as there are commercially available flow meters capable of detecting liquid flow percentages of as little as 0.1%. (such as the Vx multiphase metering system available from Schlumberger Inc., the assignee of this application) An example of such a flow meter is the Vx multiphase metering system available from Schlumberger Inc., the assignee of this application. Accordingly, if the multiphase flow is comprised of 0.1% liquid and 99.9% gas, the liquid pulse need only be of the volume necessary to increase the liquid flow by 0.1%. While the absolute increase in the liquid flow is only a fraction of a percent, the total liquid flow will have been increased by 100% (to 0.2%), thus providing a relatively large increase in the liquid flow that can be effectively used to calibrate the flow meter. Of course, the pulse used may be substantially larger than the smallest amount necessary for detection by the flow meter.

Figure 5:
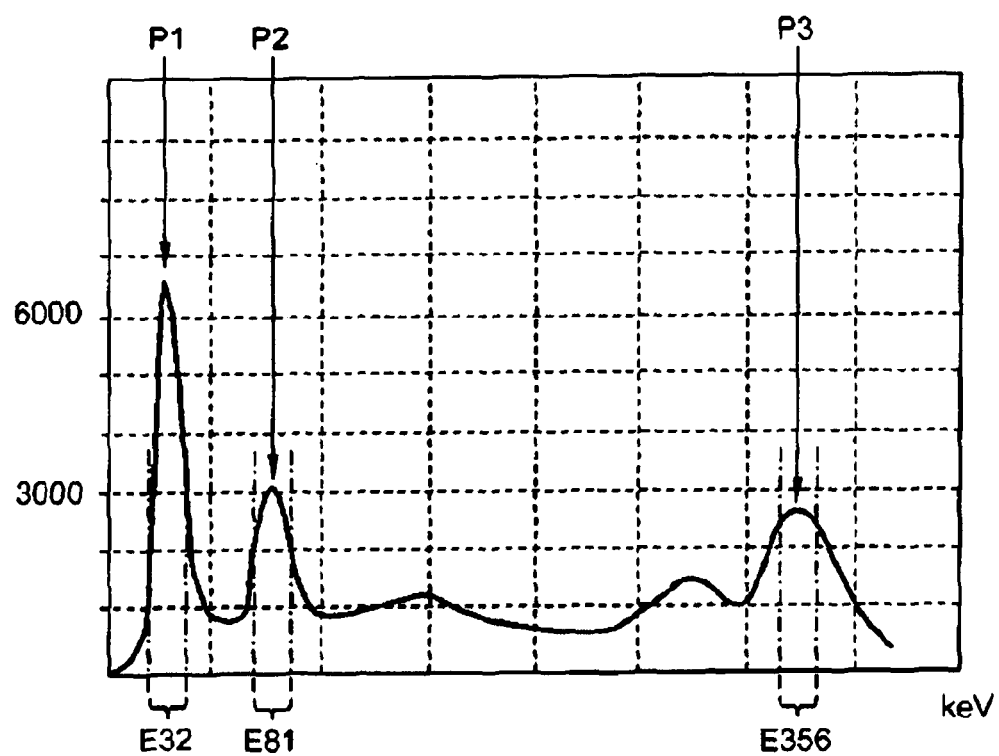
FIG. 5 illustrates a typical gamma ray emission or detection spectra (measured count rates as a function of energy) of the dual energy fraction meter included in the system of the invention.

Immediately after the pump discharges the fluid pulses, the digital controller 8 of the dual energy fraction flow meter 5 determines the flow rates of the individual phases of the multiphase fluid mixture FM, the water liquid ratio, and other values based on measurements provided by the sensors and the detector 7 in the following manner. The source 6 is a photo-producing source, for example a gamma-X photon source or an X-ray source. Preferably, the source produces photons of at least three different energy levels (two low energy levels and a high energy level). For example, as shown in FIG. 5, the source is made of the radioisotope Barium 133 producing gamma photons. The energies of the photons are distributed in a spectrum with several peaks P1, P2, P3, a first peak P1 at a low energy around 32 keV, a second peak P2 at a low energy around 81 keV and a third peak P3 at a high energy around 356 keV. Alternatively, a known X-ray tube may be used as source 6. The detector 7 comprises a scintillator crystal (e.g. NaIT1) and a photomultiplier. The detector measures the count rates in the various energy windows corresponding to the attenuated gamma rays that have passed through the fluid mixture. Energy windows E32, E81, E356 in which count rates are measured are associated with the peaks in the energy spectrum of the gamma photons P1, P2, P3, respectively. The detector provides three series of signals representative of the numbers of photons detected in the first energy window E32, the second energy window E81, and the third energy window E356. The first E32 and second E81 energy windows are such that the measurements in these energy windows are mainly sensitive to the fluid fractions of fluid mixture and the constituting elements (composition) due to the photoelectric and Compton effects at these energies. The third energy window E356 is such that the measurements in this energy window are substantially sensitive to the density of the constituting elements due to the Compton Effect only at this energy.

Figure 6:
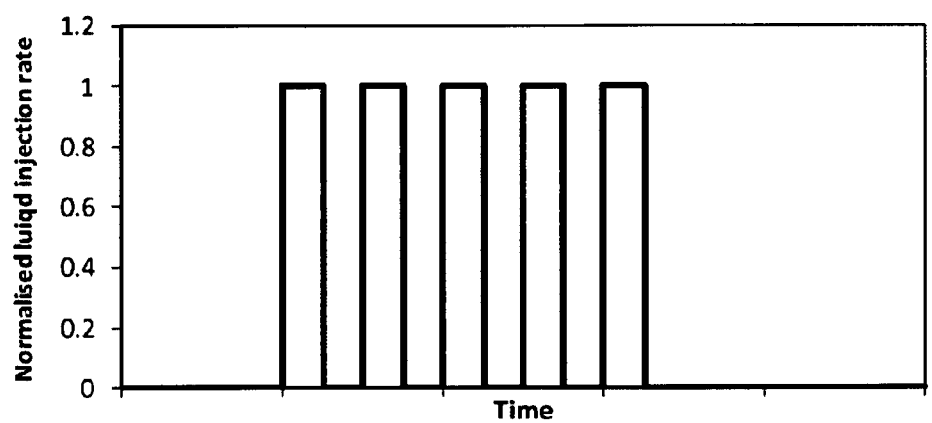
FIG. 6 illustrates a square wave pattern of fluid discharge from the pump of the flow meter system that would give constant and consistent measured increases of minority phase flow over time.

The injected liquid is in addition to the liquid that is already flowing in the FM but because the liquid is injected at known times for known durations its effect on the flow meter 5 can easily be distinguished from the main flow. The digital controller 8 compares the measured increase in the liquid phase against an expected increase, which has been pre-computed on the basis of the known volume of the pulse or pulses of liquid generated by displacement of the piston or other positive displacement component of the pump 12. This allows the response of the dual energy fraction flow meter 5 to be checked, and if necessary, for corrections to be made to the system 1 without interrupting the main flow. Of course, the measured increases in the liquid phase flow can be subtracted out of the measured total liquid phase flow to arrive at an accurate measurement of the actual liquid fraction in the multiphase flow. Additionally, when the pump 12 is operated to provide a series of uniform pulses of liquid into the fluid mix FM, the measured increase can be subtracted out for each of the individual pulses and the results averaged, yielding an even higher degree of accuracy. To this end, a series of "square wave" pulses of liquid are preferred as such a square wave pattern of discharge from the pump 12 would give the most constant and consistent measured increases of liquid phase in the fluid mix over time. Such a square wave pattern is illustrated in FIG. 6.

The invention has been described in detail with particular reference to certain preferred embodiments thereof, but it will be understood that variations and modifications can be effected within the spirit and scope of the invention. For example, the operation of the invention could be "reversed" when the predominant phase is liquid, i.e. the system of the invention could inject known quantities of gas into a flow that was predominantly liquid to enhance the accuracy of measuring the gas fraction.

We claim:

1. A system for accurately measuring the percentage amounts of liquid and gas phases in a multiphase fluid flowing through a conduit when one of the phases constitutes a minority of the multiphase flow, comprising:
   a flow meter positioned on said conduit that measures the percentage amounts of liquid and gas phases in said multiphase fluid flowing through said conduit, and
   a pump connected to said conduit upstream of said flow meter that introduces at least one pulse of a known quantity of a fluid having the same or substantially the same composition as the minority phase which temporarily increases the amount of the minority phase by an amount that is detectable by the flow meter.

2. The system of claim 1, wherein the flow meter includes a dual energy fraction meter and a differential pressure sensor.

3. The system of claim 2, further comprising a digital processor that is operably connected to said dual energy fraction meter and differential pressure sensor and which computes the changes in the percentage amounts of the liquid and gas phases which should have occurred as a result of the introduction of said pulse of known quantity of the minority phase, and compares the measured changes with the computed changes in order to calibrate the flow meter.

4. The system of claim 3, wherein said digital processor subtracts out the computed change in the amount of the minority phase to compute an actual percentage of the minority phase in the multiphase flow.

5. The system of claim 4, wherein the pump introduces a plurality of same-quantity pulses at uniform time periods of a fluid having the same or substantially the same composition as the minority phase into said multiphase flow, and said digital processor subtracts out the determined change in the amount of the minority phase for each of the plurality of pulses and averages the results to more accurately determine the actual percentage of minority phase in the multiphase flow.

6. The system of claim 2, wherein the dual energy fraction meter measures differences in the absorption of the multiphase flow of two different wavelengths of gamma radiation.

7. The system of claim 2, wherein the conduit includes a constricted portion, and the differential pressure sensor measures a pressure differential between said constricted portion and an unconstricted portion of said conduit.

8. A system for accurately measuring the percentage amounts of liquid and gas phases in a multiphase fluid flowing through a conduit when one of the phases is a minority phase constituting less than about 20% of the multiphase fluid, comprising:
   a flow meter positioned on said conduit that measures the percentage amounts of liquid and gas phases in said multiphase fluid flowing through said conduit;
   a pump connected to said conduit upstream of said flow meter that introduces at least one pulse of a known quantity of a fluid having the same or substantially the same composition as the minority phase, said pulse having a volume sufficient to temporarily increase the amount of the minority phase by an amount that is detectable by the flow meter, and
   a digital processor that computes the changes in the percentage amounts of the liquid and gas phases which should have occurred as a result of the introduction of said pulse of minority phase, and subtracts the computed changes from the changes measured by the flow meter in order to calibrate the flow meter and determine the actual percentage amounts of liquid and gas phases in said multiphase fluid flowing through said conduit.

9. The system of claim 8, wherein the pump introduces a plurality of uniform, same-quantity pulses of a fluid having the same or substantially the same composition as the minority phase fluid into said multiphase flow, and said digital processor subtracts out the determined change in the amount of the minority phase for each of the plurality of pulses and averages the results to more accurately determine the percentage of the minority phase in the multiphase flow.

10. The system of claim 8, wherein the flow meter includes a dual energy fraction meter and a differential pressure sensor, each of which is operably connected to said digital processor.

11. A method of accurately measuring the percentage amounts of liquid and gas phases in a multiphase fluid flowing through a flow meter that includes a dual energy fraction meter and a differential pressure sensor when one of the phases constitutes a small portion of the multiphase fluid, comprising:
   introducing at least one pulse of a known amount of a fluid having the same or substantially the same composition as the small portion upstream of the flow meter to temporarily increase amount of the small portion of the multiphase fluid to about half of the flow of the multiphase fluid, and
   measuring via said flow meter the changes in the percentage amounts of liquid and gas phases at the time said small portion is increased by said pulse.

12. The method of claim 11, further including the steps of:
   determining the changes in the percentage amounts of the liquid and gas phases which should have occurred as a result of the introduction of said at least one pulse, and
   comparing the measured changes with the determined changes in order to calibrate the flow meter.

13. The method of claim 12, further including the step of:
   subtracting out the determined change in the amount of the small portion to more accurately determine the percentage of the small portion in the multiphase flow.

14. The method of claim 11, wherein the shape of the fluid pulse is substantially that of a square wave.

15. The method of claim 11, wherein the small portion constitutes less than about 20 percent of the multiphase flow, and said pulse increases the small portion by an amount that is at least detectable by the flow meter.

16. The method of claim 11, wherein the pulse duration is longer than a minimum amount of time for the flow meter to detect changes in the percentage amounts of liquid and gas phases caused by said pulse.

17. The method of claim 11, wherein the small portion is the liquid phase of a multiphase fluid flow from a hydrocarbon well.

18. The method of claim 11, wherein the small portion is the gaseous phase of a multiphase fluid flow from a hydrocarbon well.

19. The method of claim 11, wherein a plurality of equal pulses are sequentially introduced into the multiphase fluid upstream of the flow meter, each of which is substantially in the shape of a square wave.

20. The method of claim 19, further including the step of subtracting out the determined change in the amount of the small portion for each of the plurality of pulses and averaging the results to more accurately determine the percentage of the small portion in the multiphase flow.

* * * * *